United States Patent [19]
Wardle

[11] Patent Number: 5,882,491
[45] Date of Patent: Mar. 16, 1999

[54] ELECTRODE FOR ELECTROCHEMICAL MACHINING, METHOD OF ELECTROCHEMICAL MACHINING WITH SAID ELECTRODE, A BEARING AND A METHOD OF DETERMINING A PROFILE USING SAID ELECTRODE

[75] Inventor: Frank Peter Wardle, Swindon, England

[73] Assignee: SKF Industrial Trading & Development Company B.V., Nieuwegein, Netherlands

[21] Appl. No.: 860,120

[22] PCT Filed: Jan. 2, 1996

[86] PCT No.: PCT/NL96/00001

§ 371 Date: Oct. 21, 1997

§ 102(e) Date: Oct. 21, 1997

[87] PCT Pub. No.: WO96/20061

PCT Pub. Date: Jul. 4, 1996

[51] Int. Cl.⁶ ..................................................... C25B 11/00
[52] U.S. Cl. ...................... 204/290 R; 205/640; 205/645
[58] Field of Search ................................... 205/640, 645, 205/652; 204/280, 290 R

[56] References Cited

U.S. PATENT DOCUMENTS 4,541,909  9/1985  Fromson ................................. 204/129

FOREIGN PATENT DOCUMENTS 2005780   12/1969  France .
1515195   12/1971  Germany .
A61-023796  6/1986  Japan .

*Primary Examiner*—Kathryn Gorgos
*Assistant Examiner*—Thomas H Parsons
*Attorney, Agent, or Firm*—Mayer, Brown & Platt

[57] ABSTRACT

The invention relates to an electrode for electrochemical machining. An electrode comprising a plurality of electrode segments separated by insulating material. As desired, different voltages are applied to each of the electrode segments giving control over the amount of material locally removed from the metal piece. The invention also relates to a method of electrochemical machining.

8 Claims, 1 Drawing Sheet

ELECTRODE FOR ELECTROCHEMICAL MACHINING, METHOD OF ELECTROCHEMICAL MACHINING WITH SAID ELECTRODE, A BEARING AND A METHOD OF DETERMINING A PROFILE USING SAID ELECTRODE

This application is a national phase filing of international application number PCT/NL 96/00001, filed Jan. 2, 1996.

BACKGROUND OF THE INVENTION

1. Field of the Invention

The present invention relates to an electrode for electrochemical machining, said electrode comprising a plurality of electrode segments, said electrode segments being separated from each other and having a electrically non-insulating end for facing a metal piece to be electrochemically machined, the electrode segments being separated from each other by an electrically insulating layer.

2. Description of the Related Art

Such an electrode is known from the German patent application DE 1.515.195. FIGS. 3 and 4 show an electrode comprising electrode segments, each electrode segment being connected to a power source. The current through each electrode segment can be controlled independently from the other electrode segments. The electrode segments have a rectangular cross-section.

BRIEF SUMMARY OF THE INVENTION

The object of the present invention is to provide an electrode which allows for controlled and flexible electrochemical machining resulting in a smooth curvature of the metal piece with a limited number of electrode segments.

To this end, the electrode according to the present invention is characterized in that the intersection of the insulating layer and the non-insulated end of the electrode segment is, over at least part of its length, inclined to the nearest side walls of the electrode.

Such an electrode allows the application of different voltages to different electrode segments relative to the metal piece to be machined resulting in a smoothly electrochemically machined metal piece with a limited number of electrode segments.

U.S. Pat. No. 4,541,909 describes an electrode for electrochemical machining wherein said electrode comprises a plurality of electrode segments without an electrically insulating layer between the electrode segments.

The present invention also relates to a method of electrochemical machining of a metal piece using an electrode comprising a plurality of electrode segments, wherein different current densities are applied to each of the electrode segments of the electrode, depending on the amount of material to be removed at a particular site of the metal piece facing a corresponding non-insulated end of the electrode segment.

This method is characterized in that an electrode, according to the present invention is used wherein the intersection of the insulating layer and the non-insulated end of the electrode segment is, over at least part of its length, inclined to the direction in which the electrode and the metal piece move relatively to each other.

Thus, the method according to the present invention provides for an electrochemical machining process resulting in a metal piece having a smoothly curved surface.

Finally, the present invention relates to a method of measuring the profile of a metal piece, being characterized in that an electrode comprising a plurality of electrode segments according to the present invention is put above the surface of the metal piece, forming a gap which is filled with an electrically conducting fluid, and the resistance over the gap is measured for each of the segments.

BRIEF DESCRIPTION OF THE SEVERAL VIEWS OF THE DRAWINGS

The present invention will now be elucidated with the aid of the drawing, illustrating the invention by way of example.

DETAILED DESCRIPTION OF THE INVENTION

Figure 1:
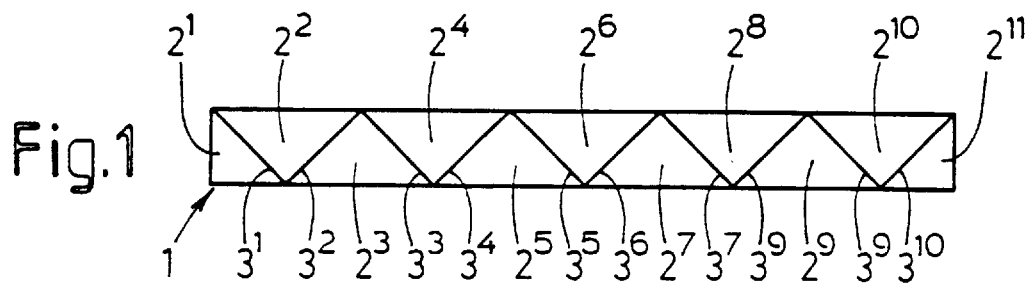
FIG. 1 is a cross section of an electrode according to the invention.

FIG. 1 shows an electrode 1 for electrochemical machining, which electrode comprises electrode segments 2' to 2" which are separated on the sides of the electrode segments by an electrically insulating layer 3' to 3'''. The electrode 1 is covered with an electrically insulating layer, leaving the end of each electrode segment free of electrically insulating material for machining the metal piece to be electrochemically machined, and contact means (not shown) for applying a voltage to each of the electrode segments 2.

Figure 2:
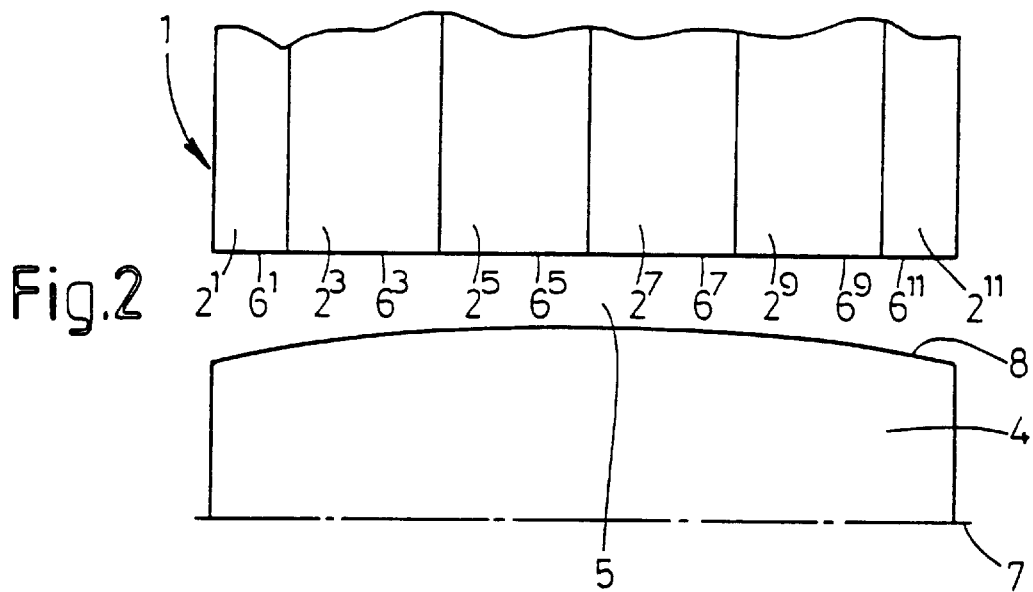
FIG. 2 is a side view of the electrode and half of a cylindrical rotating body.

FIG. 2 shows a side view of a part of the electrode 1 shown in FIG. 1. The metal piece to be electrochemically machined is here a cylindrical rotating body, roller 4 (partially shown), for a cylindrical roller bearing, which cylindrical roller 4 is spaced from the electrode 1 forming a gap 5 through which electrolyte is passed. As shown in FIG. 2, non-insulating ends 6' or 6" (uneven shown) of the electrode segments 2 face the cylindrical roller 4 and lie in one plane. More specifically, the plane is a flat surface. This means that such an electrode 1 is easy and cheap to manufacture and this geometry is possible due to the fact that the voltage over the gap 5 can be chosen for each electrode segment 2 separately.

To electrochemically machine the cylindrical roller 4, it is rotated around the axis indicated with numeral 7 and the non-insulated ends 6 of the electrode segments 2 form a narrow blade.

Cylindrical rollers 4 in a cylindrical roller bearing are more strained at the surfaces of the cylinder near the ends of the cylindrical roller 4. To spread the load over the full cylindrical surface, the roller 4 must be of a slightly smaller diameter near the ends of the roller 4. To this end, the voltage applied to the electrode segments 2 is increased. towards the outer electrode segments 2' and 2" respectively. Thus, the current density and hence the amount of material removed from the cylindrical roller 4 is increased near its ends. The resulting profile 8 shown in FIG. 2 is highly exaggerated. Usually, the difference in diameter between the centre and the ends of the roller 4 is on the order of microns or tens of microns.

Figure 3:
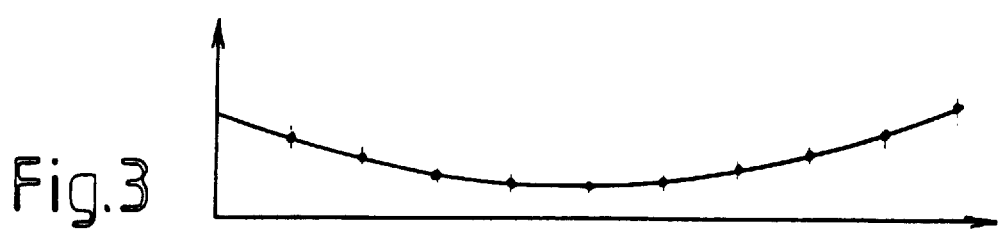
FIG. 3 shows the current density as experienced by cylindrical rotating body of FIG. 2.

As the electrode 1 and the metal piece are rotated relative to each other while being parallel to each other, and while different voltages are applied to the electrode segments 2, and as the intersections of the insulating layers 3 and the non-insulated ends 6 of the electrode segments 2 are, over at least part of their lengths, inclined to the direction in which the electrode 1 and the metal piece 2 move, relative to each other, this results in a smooth variation of the current density (as shown in FIG. 3) over the length of the cylindrical roller 4. Thus, it is possible to obtain a smooth curvature of the metal piece with a limited number of electrode segments 2.

For a smooth variation it is preferred that the insulating layers 3 of the different electrode segment sides meet each other.

The particular design of the electrode 1 according to the present invention enables the workpiece form to be measured and hence can produce an accurate form irrespective of the initial form of the workpiece. With the currently used single piece conforming electrodes, the initial workpiece form must be carefully controlled and the machining time and current carefully matched to the required form.

Measurement of the workpiece form is achieved by measuring the resistance of the gap local to each segment 2 of the electrode 1. The resistance is proportional to the local gap width 5, so by comparing the local resistance measurements of adjacent segments 2, the workpiece profile can be determined. As desired the electrode may be moved relative to the metal piece. Thus the present invention allows the determination of the profile of a metal piece.

I claim:

1. Electrode for electrochemical machining, said electrode (1) comprising side walls and a plurality of electrode segments (2), said electrode segments (2) being separated from each other and having an electrically non-insulating end (6) for facing a metal piece to be electrochemically machined, the electrode segments (2) being separated from each other by an electrically insulating layer (3); characterized in that the intersection of the insulating layer (3) and the non-insulated end (6) of the electrode segment (2) is, over at least part of its length, inclined to the nearest side wall of the electrode (1); and, wherein the non-insulating ends (6) of the electrode segments (2) form a blade.

2. Electrode according to claim 1, characterized in that the non-insulating ends (6) of the plurality of electrode segments (2) lie substantially in one plane.

3. Electrode according to claim 2, characterized in that the plane is a flat surface.

4. Electrode according to claim 1, characterized in that the insulating layers (3) of different electrode segment sides meet each other.

5. Method of electrochemical machining a metal piece using an electrode comprising a plurality of electrode segments, wherein different current densities are applied to each of the electrode segments of the electrode, depending on the amount of material to be removed at a particular site of the metal piece facing a corresponding non-insulated end of the electrode segment, characterized in that an electrode (1) according to claim 1 is used wherein the intersection of the insulating layer (3) and the non-insulated end (6) of the electrode segment (2) is, over at least part of its length, inclined to the direction in which the electrode (1) and the metal piece move relative to each other.

6. Method according to claim 5, characterized in that the metal piece is a bearing ring.

7. Method according to claim 5, characterized in that the metal piece is a cylindrical rotating body.

8. Method of measuring the profile of a metal piece, characterized in that an electrode (1) comprising a plurality of electrode segments (2) according to claim 1 is put above the surface of the metal piece, forming a gap (5) which is filled with an electrically conducting fluid, and the resistance over the gap (5) is measured for each of the segments.

* * * * *